United States Patent [19]

Perry et al.

[11] Patent Number: 4,675,149
[45] Date of Patent: Jun. 23, 1987

[54] JET PUMP BEAM HOLDER/POSITIONER TOOL

[75] Inventors: Richard W. Perry; John Chang, both of San Jose; Robert C. Dixon, Morgan Hill, all of Calif.

[73] Assignee: General Electric Company, San Jose, Calif.

[21] Appl. No.: 824,898

[22] Filed: Jan. 31, 1986

[51] Int. Cl.$^4$ .............................................. G21C 19/00
[52] U.S. Cl. .................................. 376/260; 376/247; 376/372; 376/461
[58] Field of Search ............... 376/260, 372, 461, 463, 376/407, 392, 285, 302, 304, 247; 417/184, 189, 191

[56] References Cited

U.S. PATENT DOCUMENTS

| | | | |
|---|---|---|---|
| 3,378,456 | 4/1968 | Roberts | 376/407 |
| 3,380,649 | 4/1968 | Roberts | 376/407 |
| 3,445,335 | 5/1969 | Gluntz | 376/407 |
| 3,719,524 | 3/1973 | Ripley et al. | 376/372 |
| 3,723,247 | 3/1973 | Leine et al. | 376/260 |
| 3,953,289 | 4/1976 | Costes | 376/461 |
| 3,987,860 | 10/1976 | Jabsen | 376/302 |
| 4,285,770 | 8/1981 | Chi et al. | 376/407 |
| 4,393,899 | 7/1983 | Tsuji et al. | 376/260 |
| 4,468,172 | 8/1984 | Dixon et al. | 376/407 |
| 4,499,691 | 2/1985 | Karazim et al. | 51/241 S |

FOREIGN PATENT DOCUMENTS 0021114  6/1976  Japan ................................. 376/285

*Primary Examiner*—Deborah L. Kyle
*Assistant Examiner*—Daniel Wasil
*Attorney, Agent, or Firm*—Ivor J. James, Jr.; Raymond G. Simkins

[57] ABSTRACT

Repair apparatus and a method of repair utilized for securing pressure sensing lines to jet pump diffusers in boiling water nuclear reactors is disclosed. Conventional access is made to the reactor with removal of the jet pump inlet mixer to expose the upwardly disposed frustum-shaped diffuser. The diffuser includes a pressure sensing line mounted by a stand off block. It has been found that this pressure sensing line becomes separated from the diffuser due to vibration and accompanying metal fatigue. A repair is effected by introduction of an arcuate beam configured for live support at each end. This pressure sensing line and stand off block is bracketed by the upper end of a beam to register the line to the stand off block. The lower end of the beam brackets the line and stands off from the diffuser at a second introduced stand off block. The line is provided with two points of support to prevent further dislodging vibration. The beam is in turn captured by an elliptical ring clamp encircling the essentially circular section of the diffuser between the beam and its captured line. A saddle on the elliptical ring opposite the clamped beam tensions the ring diameter. The ring clamp fits in a preformed notch on the beam and is disposed normally to the surface of the diffuser from the saddle. This disposition of the ring urges the beam upwardly in latched engagement with the stand off block so as to position the line at the upper end of the beam to the stand off block. A universal beam holder for the remote clamping and release of the beam as well as universal manipulation of the beam in pitch, yaw and azimuth is disclosed. This universal beam holder enables positioning of the beam in the submerged radio-active environment of the reactor. The clamp also enables the beam to be maintained in position with the line and stand off block while the ring clamp captures the beam. When the ring clamp is fastened to the beam by securing of a wedge fitting at the saddle, the universal beam holder releases the beam and is withdrawn. Clamping of the pressure sensing line at two spaced apart points secures against both initial detachment and further vibration damage.

12 Claims, 9 Drawing Figures

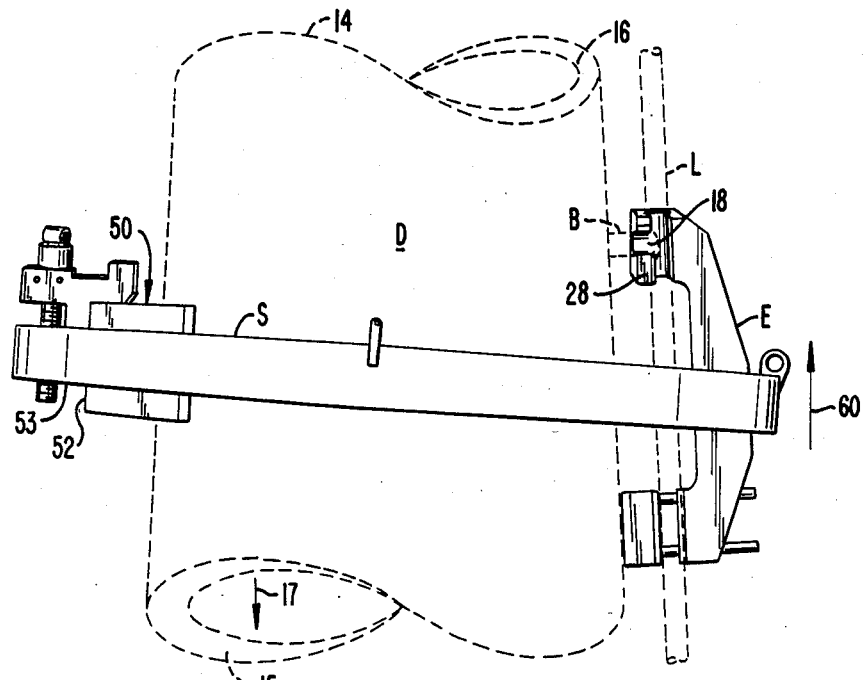
FIG._1.
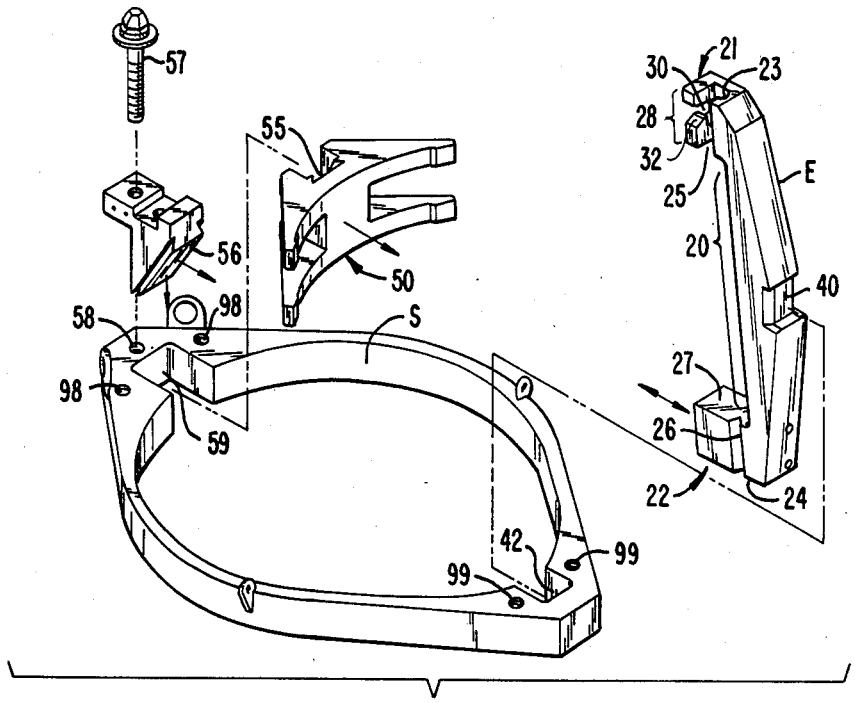
FIG._2.

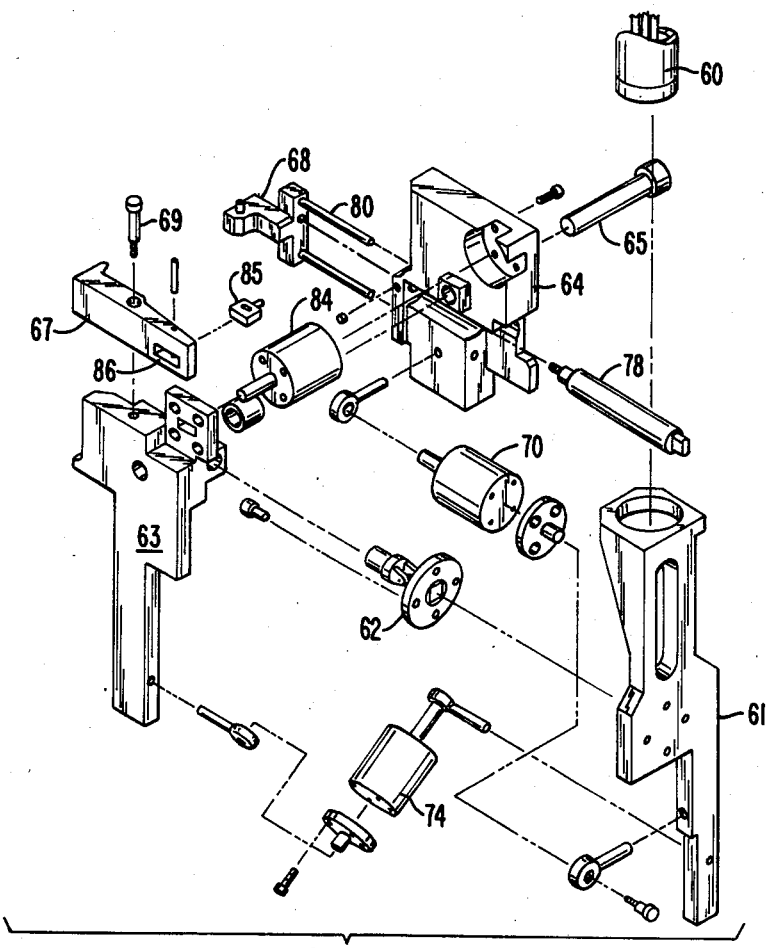
FIG._3.
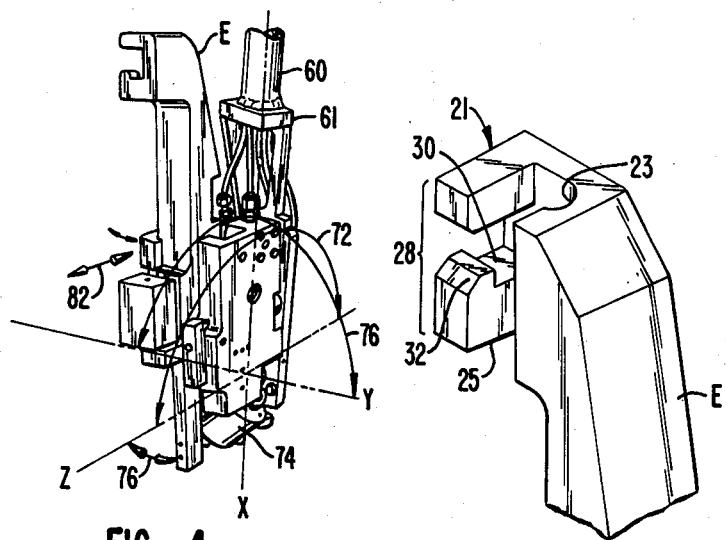
FIG._4.  FIG._6.

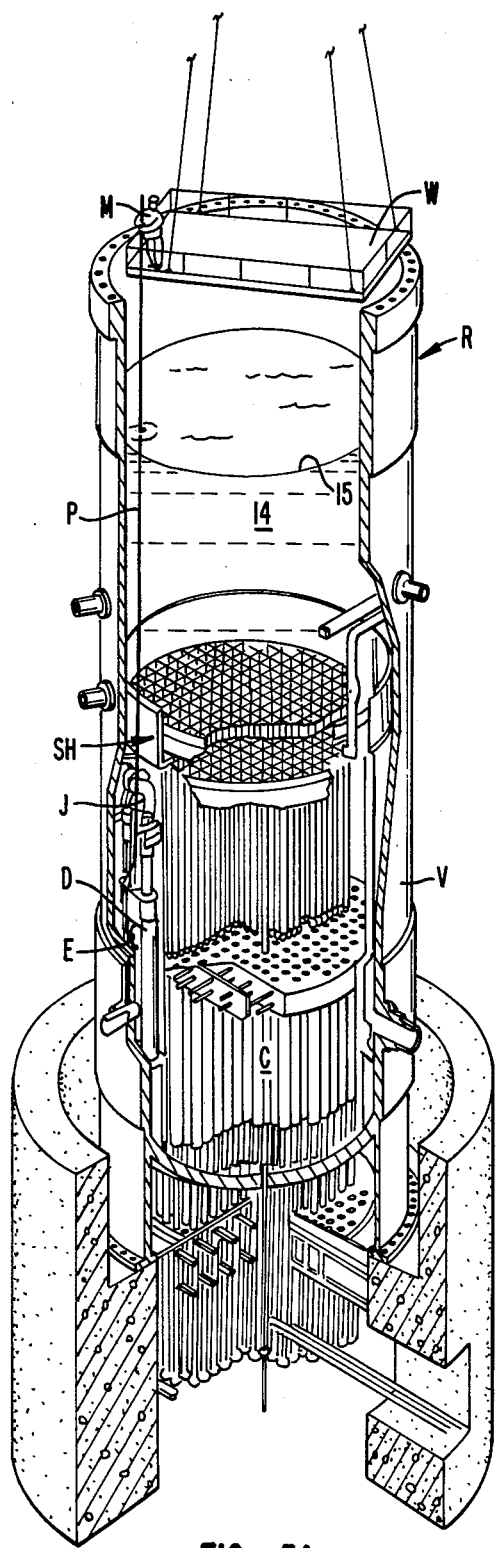
FIG._5A.
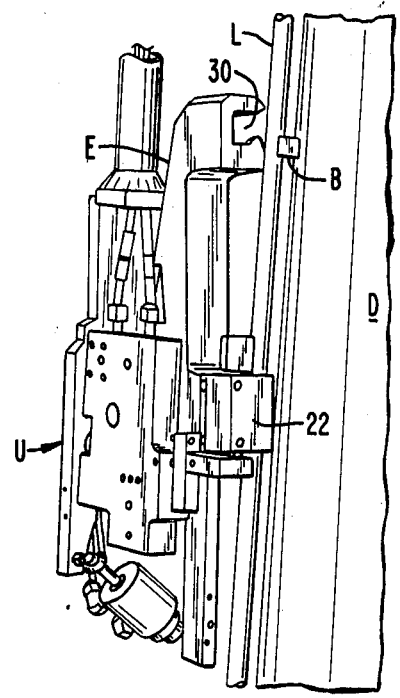
FIG._5B.
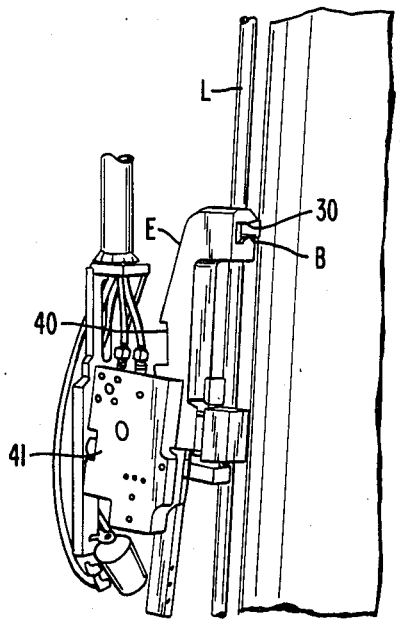
FIG._5C.

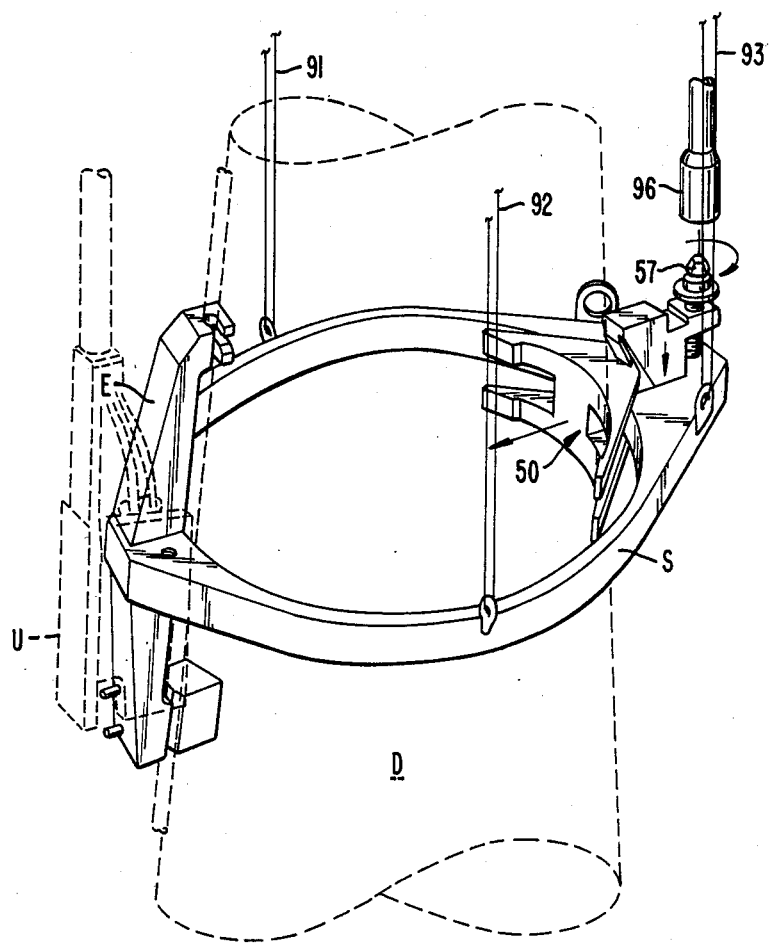
FIG._5D.

JET PUMP BEAM HOLDER/POSITIONER TOOL

BACKGROUND OF THE INVENTION

This invention relates to jet pumps in boiling water nuclear reactors (BWR). More particularly, a repair process and apparatus for securing pressure sensing lines in nuclear reactors is disclosed.

Statement of the Problem

Boiling water nuclear reactors are immense. Referring to FIG. 5A of the drawings, a reactor R is illustrated having its dome removed with a working platform W mounted over the water pool 14. A worker M is illustrated manipulating a pole P. The pole P is affecting the repair herein described. This repair occurs some 53 feet below the surface level 15 of water 14. Repair takes place in the narrow cylindrical interstices between the reactor shroud SH and the vessel wall V. In this interstices a series of jet pumps J are located. These pumps when approximately disassembled for repair, all have upwardly exposed frustum-shaped diffusers D.

The problem requiring repair can be easily understood. In order to assure adequate circulation of cooling water in the downward direction, the interstices between the vessel of the reactor V and the core C is ringed with a series of vertical jet pumps. These jet pumps cause the water to flow downwardly on the outside of the reactor core so that the water can circulate upwardly through the center of the reactor core and generate steam. The generated steam passes upwardly for discharge through respective separator and dryer assemblies; these assemblies being removed for the purposes of this repair.

Jet pumps utilized for cooling nuclear reactors of the boiling water reactor type are disclosed in Roberts U.S. Pat. No. 3,378,456 issued Apr. 16, 1968. For purposes of this application, it will be noted that the jet pumps include an inlet mixer which is generally "candy cane" shaped. This inlet mixer can be removed from over the top of frustum-shaped diffusers. These diffusers are shown in FIG. 5 of the Roberts patent and are illustrated in pertinent detail at one diffuser in FIG. 1 herein.

For the safe operation of a nuclear plant, it is required that the pressure drop across the diffuser be continually sensed. For this purpose, small pressure sensing lines are mounted to the exterior of the diffuser, and communicate through the walls of the diffuser so that the pressure differential may be sensed. See D. M. Gluntz, U.S. Pat. No. 3,445,335 issued May 20, 1969.

It is known to remove the upper section of the jet pumps so as expose the diffusers without the "candy cane" assembly for repair. See Karazim et al., U.S. Pat. No. 4,499,691. The present invention assumes as a starting point that such removal has occurred and that the diffuser is exposed for repair.

It has been discovered that the pressure sensing lines vibrate. This vibration subjects the stainless steel stand off blocks mounted between the diffuser and line to sever between the block and line. This severance of the line from its mounted stand off block is an undesirable condition. It is the purpose of this invention to repair this condition.

Unfortunately, the environment for this repair is extremely hostile. First, it is some 53 feet deep in a pool of water. Second, the pool is located in an interstitial between the cylindrical reactor shroud and the cylindrical vessel sidewalls. The portion of the pool where the repair occurs is under a ledge; direct viewing from the surface is not possible. This narrow interstitial area is occupied in large measure by pumps, which it is the purpose of this invention to repair; access is restricted. Finally, the pumps are radioactive. Everything must be remotely manipulated.

Summary of the Relevant Literature

Despite the hostility of such environments, remote removal of bolts for disassembly of the jet pumps is known. See Karazim et al., U.S. Pat. No. 4,499,691, issued Feb. 19, 1985, entitled Jet Beam Bolt Retainer Cutter.

Moreover, it is known to fasten a clamp about a diffuser so as to bring the pressure sensing line down on its stand off block. However, this simple clamping type of repair has been found unsatisfactory for two reasons.

First, where the line has become detached from the stand off block, clamping of the line to the diffuser may or may not clamp the line on top of the stand off block. Where the line is not clamped to the stand off block, extraordinary deformation of the line to a position adjacent the diffuser occurs.

Secondly, such clamping does not solve the problem which caused dislodgement of the line in the reactor in the first instance. Specifically, the line, although reclamped, is still free to vibrate.

SUMMARY OF THE INVENTION

Repair apparatus and a method of repair utilized for securing pressure sensing lines to jet pump diffusers in boiling water nuclear reactors is disclosed. Conventional access is made to the reactor with removal of the jet pump inlet mixer to expose the upwardly disposed frustum-shaped diffuser. The diffuser includes a pressure sensing line mounted by a stand off block. It has been found that this pressure sensing line becomes separated from the diffuser due to vibration and accompanying metal fatigue. A repair is effected by introduction of an arcuate beam configured for live support at each end. This pressure sensing line and stand off block is bracketed by the upper end of a beam to register the line to the stand off block. The lower end of the beam brackets the line and stands off from the diffuser at a second introduced stand off block. The line is provided with two points of support to prevent further dislodging vibration. The beam is in turn captured by an elliptical ring clamp encircling the essentially circular section of the diffuser between the beam and its captured line. A saddle on the elliptical ring opposite the clamped beam tensions the ring diameter. The ring clamp fits in a preformed notch on the beam and is disposed normally to the surface of the diffuser from the saddle. This disposition of the ring urges the beam upwardly in latched engagement with the stand off block so as to position the line at the upper end of the beam to the stand off block. A universal beam holder for the remote clamping and release of the beam as well as universal manipulation of the beam in pitch, yaw and azimuth is disclosed. This universal beam holder enables positioning of the beam in the submerged radioactive environment of the reactor. The clamp also enables the beam to be maintained in position with the line and stand off block while the ring clamp captures the beam. When the ring clamp is fastened to the beam by securing of a wedge fitting at the saddle, the universal beam holder releases the beam and is withdrawn. Clamping of the pressure sensing line at two spaced apart points secures against both initial detachment and further vibration damage.

Other Objects and Advantages

It is an object of this invention to disclose a beam for registering a detached pressure sensing line to a stand off block. According to this aspect of the invention, a beam with upper and lower ends is provided. The beam is configured at both ends to and towards the pressure sensing line with female semicircular concavities or line receiving notch for capturing the line. The upper end of the beam includes a stand off block locator configured immediately below the line receiving notch. This stand off block locator has a space for passing the stand off block therethrough and a hook for engaging the stand off block. Consequently, when the beam is urged upwardly into engagement with the stand off block with the line in the pipe receiving notch, the captured line is registered to the stand off block from which the line was originally detached.

An advantage of this aspect of the invention is that the detached line is placed back to its original disposition on to the stand off block.

Yet another object of this invention is to dispose a beam about the pressure sensing line which will prevent further vibration. According to this aspect, the second and lower end of the beam is provided with an introduced stand off block. This introduced stand off block is mounted for sliding movement towards and away from the lower end of the beam. When the beam is positioned, the introduced stand off block is placed between the line and diffuser. When the beam is clamped into place, the pressure sensing line is captured between the introduced stand off block and the beam at a second point. Consequently, the line is braced at two spaced apart points. Further vibration is vastly inhibited.

An advantage of the second stand off block and lower beam clamp is that the condition which caused the detachment of the line from the diffuser is corrected.

A further object of this invention is to disclose an apparatus and method of fastening the beam into place. According to this aspect, an elliptical ring clamp is utilized. The clamp surrounds the diffuser, is spaced apart from the diffuser and acts as a spring. The disclosed elliptical ring works between two diametrically opposite points on the diffuser. One of these points is a notch on the ring where the ring keys to the beam. The other diametrically opposite point is a screw driven wedge fitting and saddle. The wedge drives the saddle into firm engagement with the diffuser sidewall. Thus, the beam is clamped by the ring rigidly into position.

Yet another object of the disclosed ring is to ensure that the beam is engaged to the originally installed stand off block of the diffuser. According to this aspect of the invention, the saddle fits parallel to the surface of the diffuser opposite the pressure sensing line. This disposition causes tipping of the ring to force the beam on the line upwardly to and towards the top and narrow section of the frustum-shaped diffuser. In such upward movement, the beam firmly engages the originally installed stand off block at a hook configured in the end of the beam. Firm securing of the beam to the block with the line trapped in registration therewith occurs.

Yet another object of this invention is to maintain the beam in rigid contact with the diffuser during all conditions of operation of the reactor. According to this aspect of the invention, the saddle is tightened with respect to the wedge fitting on the ring. This tightening draws the elliptical ring in tension. Under normal and hot operating boiling water conditions, firm clamping of the beam to the line and diffuser occurs. Where cool water is injected and the diffuser thermally contracts, for example during emergency procedures for reducing neutron density in the reactor, the ring, acting as a spring, still applies securing tension to the beam and the pressure sensing line.

Yet a further advantage of the elliptically shaped ring is that it is provided with three support points for lowering by ropes onto the diffuser. These respective support points enable the ring to be maneuvered by ropes relative to the diffuser. Such maneuvering is required because of the narrow interstitial space between the reactor vessel and reactor core into which the repair must occur.

Yet another advantage of the disclosed ring and beam is that they may be subsequently removed.

Yet another object of this invention is to disclose a universal beam holder for co-action with the beam and ring. The holder is provided with three degrees of movements, these degrees of movement including pitch and yaw. These respective degrees of movement enable the beam to be remotely maneuvered when observed through a television camera. Finally, the universal beam holder is provided with automated jaws. Typically, the jaws secure the beam and are immersed and maneuvered in position relative to the line to be repaired.

An advantage of the disclosed universal beam holder is that elliptical ring may be placed over the beam while it is held in position by the holder. Once the ring clamp has fastened the beam to the pump sidewalls, the holder may be withdrawn.

A final object of this invention is to disclose a process of repair for fastening pressure sensing line to diffuser sidewalls. According to this aspect of the invention, the holder captures the beam. The beam is lowered to engage the stand off block and line immediately above the stand off block. Simultaneously, the beam is maneuvered to engage the line below the stand off block with the introduced stand off block. While the holder holds the beam in place, the elliptical ring is fitted over the beam to a position of engagement. Thereafter, the saddle on the beam is tightened and wedged into place. Finally, the beam is released from the holder and repair completed.

BRIEF DESCRIPTION OF THE DRAWINGS

Other objects, features and advantages of this invention will become more apparent after referring to the following specification and attached drawings in which;

FIG. 1 is a picture of a diffuser stand off block and line (illustrated in broken lines) with the beam and elliptical ring of this invention shown in side elevation;

FIG. 2 is an exploded view of the beam elliptical ring, ring saddle, and wedged used for fastening the beam to the diffuser;

FIG. 3 is an exploded view of the universal beam holder;

FIG. 4 is an assembled view of the exploded view of FIG. 3 illustrating the universal beam holder holding a beam and degrees of motion;

FIGS. 5A–5D are a cartoon series illustrating the repair affected by the apparatus and process with FIG. 5A being a second of a reactor illustrating the narrow interstitial area adjacent the jet pumps in which the repair occurs;

FIG. 5B illustrates the universal holder with the introduced stand off block and beam engaged to a line and the upper end of the beam being maneuvered into a position of engagement with the line and originally installed stand off block;

FIG. 5C is the view of FIG. 5B illustrating the upper beam member maneuvered into registration with the stand off block and line;

FIG. 5D illustrates tightening of the elliptical ring to secure clamping; and,

FIG. 6 is a detail of the upper end of the beam illustrating engagement with the stand off block and line.

DETAILED DESCRIPTION OF THE EMBODIMENTS

Referring to FIG. 1, a diffuser D is illustrated. The diffuser D is frustum-shaped having a lower and relatively wider end 15 and an upper, more constricted end 14. The diffuser has sidewalls 16 and typically contains water flowing downwardly in the direction of arrow 17 when the pump is operational.

As the diffuser D was originally constructed, the line L was mounted to the side of the diffuser by stand off blocks B. Dependent upon the particular reactor, various blocks B can be the site of vibrational detachment herein discussed.

Without the repair herein described, clamping of line L immediate the diffuser was only to stand off block B. Unfortunately, vibration of the line relative to the block causes separation of the line typically at the top of the block. This separation occurs at 18.

If one is to merely clamp the line to the diffuser D, there is no reason to expect that the line cease its vibration.

In order to prevent vibration in the future, it is required to brace the line at two points. These two points are spaced apart in accordance with vibrational analysis well within ordinary skill in the vibration analysis art.

The two major members of this invention are beam E and ring S. Referring to FIG. 2, these portions of this invention can be set forth.

Referring to FIG. 2, beam E is generally arcuate with a C-shaped configuration. It includes a spanning beam member 20, an upper end 21 and a lower end 22.

The beam at upper end 21 includes a pipe receiving cavity 23. Hidden from view at the lower end of the beam 22 is a second pipe receiving cavity at 24. When the beam is placed overlying line L and pressed firmly down to and on top of line L, line L captures at cavities 23 and 24.

The lower end of the beam includes an introduced stand off block 27. This introduced block 27 is preferably flat to avoid line deflection upon introduction between the line and diffuser.

The upper end of the beam and the lower end of the beam open to the side. This opening includes an upper opening 25 and a lower opening 26. (See FIG. 6)

Upper opening 25 is formed between a defined wall 28 and the top of the beam at 23. Defined wall 28 is in turn furnished with a block receiving aperture 30. This block receiving aperture 30 allows stand off block B to pass through and be captured within defined wall 28.

Finally, defined wall 28 is furnished with a hook 32. Hook 32 enables the stand off block to pass into the block receiving aperture 30. When beam E is biased upwardly, hook 32 locks to the stand off block B.

Returning to the view of FIG. 1, it can be seen that beam E will tend to move upwardly when held in place by the ring. When the stand off block is received within the beam receiving aperture 30 and the beam E is urged upwardly, hook 32 engages the sides of the stand off block. When hook 32 engages the sides of the stand off block, movement of the upper end 21 of the beam relative to the stand off block is not possible. Consequently, line L will be captured immediately over the stand off block. Such capturing will clamp the line in its original secured and assembled disposition to the originally installed stand off block.

Beam E is configured with a ring receiving notch 40. It is into this notch 40 that elliptical ring S at complementary notch 42 fits.

Ring S is elliptical and formed from stainless steel. It sits in spaced apart relation encircling the diffuser D. It stands off from the sides of diffuser D so that it may act as a spring.

Opposite beam E and notch 42 ring S is provided with a saddle 50. Saddle 50 includes a lower portion 52 which keys to the lower surface of the ring at 53 (see FIG. 1) and a wedged and keyed ramp 55.

A keyed wedge 56 is configured for sliding movement into and out of ramp 55. Such sliding movement is caused by a bolt 57 threadably engaging the ring at a threaded aperture 58. When saddle 50 resides within notch 59 in ring S, upward and downward movement of the wedge assembly 56 responsive to movement of the screw 57 causes the wedge to move the saddle 50 to move in contact with the sidewalls of the diffuser.

Returning to FIG. 1, it will be seen that the saddle 50 is disposed parallel to the sidewalls of the diffuser D. Moreover, the ring is disposed normal to the saddle 50. This being the case, when the ring S is tightened, it will attempt to draw the beam upwardly to and towards the top of the diffuser at 60. In such upward movement, hook 32 of opening 30 will firmly engage the stand off block B. Accordingly, it will be realized that the alignment of the ring has been deliberately chosen to urge the beam E into engagement with the stand off block.

Having set forth the operative portions of the beam assembly, attention may now be directed to the universal beam holder. This will be done with respect to FIGS. 3 and 4. Thereafter, the process of assembly of the clamp and beam to the jet pump diffuser will be set forth with respect to the cartoon series of FIGS. 5A-5D.

Referring to FIGS. 3 and 4, the universal beam holder can be understood. Specifically, the holder is suspended from a pole 60 by virtue of a backing piece 61. From backing piece 61, the degrees of freedom of movement of the holder are provided.

The holder includes a universal joint 62 which fastens a left holder member 63 to the holder back 61.

The holder is provided with a right side member 64. Member 64 is fastened to member 63 by bolt 65.

There are paired jaws 67, 68. These paired jaws function to capture the beam. As can be seen, jaw member 67 is pivotal on a bolt 69 relative to member 63. This jaw member is capable of opening and closing the jaws for capturing and releasing the beam.

Having set forth the main structural members, attention will now be directed to the degrees of freedom of movement of the jaws. This will be done by first indicating an appropriate fluid cylinder in FIG. 3 and illustrating the corresponding movement that the cylinder produced in FIG. 4.

To aid the reader in understanding this movement, Cartesian axes are shown superimposed on the perspective view of FIG. 4. These axes are labeled conventionally with X, Y and Z.

First, fluid cylinder 70 functions to cause the grasped beam to pitch generally in the direction of arrow 72 in FIG. 4. This movement is in plane XZ about the Y axis. Secondly, fluid cylinder 74 causes the jaw to yaw in the direction of arrow 76 of FIG. 4. This movement is in the X-Y plane about the Z axis. Thirdly, fluid cylinder 84 activates jaw 67 in capturing the beam. Finally piston 78 causes jaws 68 to move towards and away from member 64 in the direction of arrow 82. Remembering that pole 60 is suspended a distance from the work platform W and preferably can work off of a pivotal attachment to the top of the jet pump J, it can be seen that the beam E can be provided with high maneuverability.

Jaws 67, 68 must be capable of being opened and being closed. Accordingly, a piston 84 accomplishes this function through fitting 85 attached to the end of jaw 67 at 86. The jaw is thus free to open for receiving beam E, closed for supporting beam E and open again remotely for releasing beam E once the beam is secured at the site of its insertion.

Having set forth with the exploded view of FIG. 3 and the illustration of FIG. 4, the mounting of the beam, attention can now be directed to the process of repair.

Referring to FIG. 5A, man M on work platform W through manipulation of pole P manipulates the beam E to a repair site on the side of the diffuser D. Referring to FIG. 5B, universal beam holder U holding a beam E is illustrated adjacent line L and block B on diffuser D. As here illustrated, the introduced stand off block 22 on beam E has been engaged to the line L. Stand off block B is about to be fitted within opening 30.

Referring to the illustration of FIG. 5C, beam E at universal beam holder U has maneuvered the beam so that opening 30 now receives the stand off block B. In short, line L is captured, and block B is captured. The beam, now awaits the arrival of the elliptical ring S. It will be noted that the universal beam holder U is positioned so that notch 40 is free to receive the ring S. Universal beam holder U remains in this position until clamping has occurred.

Referring to FIG. 5D, holder U is shown maintaining beam E in place. Ring S has been lowered into place by three ropes, 91, 92, 93. Saddle 50 has been drawn into contact with the sides of the diffuser by the tightening of bolt 57 utilizing a torque wrench 96.

It will be observed in FIG. 2 that ring S is provided with respective level holes 98 adjacent saddle 50 and 99 adjacent beam E. These level holes are for insertion of leveling devices to check the angularity of ring S. This angularity enables the alignment of the ring to be checked before tightening of bolt 57 by torque wrench 96 occurs.

A note of caution must be added to the disclosure herein. Specifically, reference has been made to the narrow interstitial space between shroud SH and vessel V in which the working of this tool occurs. To say that this area is narrow is an understatement. Especially when one realizes that the narrow area has closely aligned side-by-side jet pumps occupying the area and is under a ledge in the reactor side wall, it turns out that the area is so narrow that the right-handed beam and tool here illustrated can repair onehalf of the lines. The construction of a left-handed tool (not illustrated but a mirror image of that disclosed) was necessary.

Moreover, elliptical ring E not only has to be lowered but has to be rotated as it is moved into position. Finally, withdrawal of universal beam holder U after tightening of bolt 57 is not trivial.

The reader will also understand that the entirety of the repair operation occurs under surveillance of a television camera (not shown).

What is claimed is:

1. In a nuclear reactor having a jet pump diffuser and a pressure sensing line and a stand off block, a beam for securing a pressure sensing line to the side of a jet pump diffuser, comprising in combination:

an arcuate beam member having an upper and a lower end and spanning a length therebetween sufficient to provide two spaced apart points of support for said line from said diffuser;

said beam defining at said points of support a line receiving concavity for locating said line relative to and generally parallel to the length of said arcuate beam;

one of the ends of said beam opening to the side to receive said line between said line receiving concavity and wall of said beam opposite said line receiving concavity;

said wall of said beam opposite said line receiving concavity defining an opening for receiving said stand off block adjacent said line whereby said line can be captured to said stand off block in registration with said stand off block;

the other end of said beam having an introduced stand off block;

means for securing said introduced stand off block for towards and away movement from said beam, said securing means permitting said introduced stand off block and beam to open to the side to receive said line whereby said introduced stand off block can move away from said beam to receive said line and towards said beam when said beam is drawn over said line to trap said line in spaced apart relation from the walls of said diffuser.

2. The beam of claim 1 and including in said one end of said beam a hook for engaging said stand off block.

3. The beam of claim 1 and including a concavity on said beam for receiving a retaining mechanism to retain said beam to the wall of said diffuser.

4. The beam of claim 1 and wherein the point of line support at the other end of said beam includes an indentation in said stand off block.

5. The invention of claim 1 and wherein the beam opens to receive said line on the left-hand side of said beam.

6. In a nuclear reactor having a jet pump diffuser and pressure sensing line and a stand off block, a beam and ring assembly for securing a pressure sensing line to the side of a jet pump diffuser, comprising in combination:

an arcuate member having an upper end and a lower end and spanning a length therebetween sufficient to provide two spaced apart points of support for said line from said diffuser;

said beam defining at said points of support a line receiving concavity for locating said line relative to and generally parallel to the length of said arcuate beam;

one of the ends of said beam defining an opening parallel to the alignment of said line and opening to the side of said beam to receive said line between a defined wall and said line receiving concavity;

said defined wall of said beam opposite said line receiving concavity defining an opening for receiving said stand off block adjacent said line whereby said line can be captured to said stand off block in registration with said stand off block;

the other end of said beam having an introduced stand off block;

means for securing said introduced stand off block for towards and away movement from said beam;

said securing means permitting said introduced stand off block and beam to open to a side of said beam to receive said line;

a ring for engaging said diffuser and biasing said beam in firm engagement to the side of said diffuser.

7. The invention of claim 6 and wherein said ring for engaging said diffuser and biasing said beam in firm engagement to the side of said diffuser includes a ring clamp.

8. The invention of claim 7 and wherein said beam defines a concavity for receiving said elliptical ring at a first portion;

said ring includes a saddle assembly mounted to said ring at a second portion;

said saddle assembly includes means for wedging said saddle assembly between said ring and diffuser to secure said beam to said line over said stand off block.

9. The invention of claim 6 and including means for securing a ring normally to the wall of said diffuser opposite said line for biasing said beam upwardly into engagement with said stand off block; and a hook in said defined wall of said beam opposite said line receiving concavity for engaging said stand off block when said beam is upwardly biased.

10. In a nuclear reactor having a jet pump diffuser and pressure sensing line and a stand off block, a beam and ring assembly for securing a pressure sensing line to the side of a jet pump diffuser, comprising in combination:

an arcuate beam member having an upper end and a lower end and spanning a length therebetween sufficient to provide two spaced apart points for said line from said diffuser;

said beam defining at said points of support a line receiving concavity for locating said line relative to and generally parallel to the length of said arcuate beam;

one of the ends of said beam opening to the side to receive said line between said line receiving concavity and a wall of said beam opposite said line receiving concavity;

said wall of said beam opposite said line receiving concavity defining an opening for receiving said stand off block adjacent said line whereby said line can be captured to said stand off block in registration with said stand off block;

the other end of said beam having an introduced stand off block;

means for securing said introduced stand off block for towards and away movement from said beam, said securing means permitting said introduced stand off block and beam to open to the side to receive said line;

an elliptical ring;

said ring having a first portion for engaging said beam and a second portion for engaging a portion of said diffuser away from said beam to draw said beam through said ring into firm engagement with the walls of said diffuser;

means for engaging said ring defined on said beam on a side of said beam opposite from said line;

a beam holder for grasping said beam at an end away from said means for engaging said ring;

said beam holder having members for grasping and releasing said beam;

said beam holder further including means for maneuvering said beam to position said beam to said line and said stand off block; and engaging said beam, said ring configured for passage between said universal beam holder and said beam to engage said beam firmly to said stand off block and line.

11. A process for securing a beam and ring to a pressure sensing line on the side of a jet pump diffuser at a stand off block for attaching said line to a diffuser in a boiling water nuclear reactor comprising the steps of:

providing an arcuate beam member having an upper end and a lower end and spanning a length therebetween sufficient to provide two spaced apart points for said line from said diffuser, said beam defining at said points of support a line receiving concavity for locating said line relative to and generally parallel to the length of said arcuate beam, one of the ends of said beams opening to the side to receive said line between said line receiving concavity and a wall of said beam opposite said line receiving concavity, said wall of said beam opposite said line receiving concavity defining an opening for receiving said stand off block adjacent said line whereby said line can be captured to said stand off block and registration with said stand off block;

providing at the other end of said beam an introduced stand off block having means for permitting towards and away movement of said stand off block from said beam;

maneuvering the ends of said beam to capture said line;

maneuvering said one end of said beam to receive said stand off block;

providing a ring for attachment to the side walls of said diffuser for biasing said beam to said diffused;

attaching said ring to said beam while said beam is in place over said line and said stand off block;

tightening said ring over said beam to secure said line in registration with said stand off block and provide said line with a second point of support at said introduced stand off block.

12. The process of claim 11 and wherein said tightening step includes wedging said ring to said diffuser.

* * * * *